(12) United States Patent
Lu et al.

(10) Patent No.: US 9,996,192 B2
(45) Date of Patent: Jun. 12, 2018

(54) ARRAY SUBSTRATE, METHOD FOR REPAIRING TOUCH LINE, AND DISPLAY PANEL

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Feng Lu, Shanghai (CN); Songlin Jin, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 39 days.

(21) Appl. No.: 15/194,272

(22) Filed: Jun. 27, 2016

(65) Prior Publication Data

US 2017/0185223 A1 Jun. 29, 2017

(30) Foreign Application Priority Data

Dec. 24, 2015 (CN) .......................... 2015 1 0989016

(51) Int. Cl.
  *G06F 3/041* (2006.01)
  *G06F 3/044* (2006.01)
  *G09G 3/20* (2006.01)
(52) U.S. Cl.
  CPC ............ *G06F 3/0418* (2013.01); *G06F 3/044* (2013.01); *G06F 3/0412* (2013.01); *G09G 3/2092* (2013.01); *G09G 2330/08* (2013.01)

(58) Field of Classification Search
  CPC ...... G06F 3/041; G06F 3/0412; G06F 3/0418; G06F 3/044; G06F 2203/04103;
  (Continued)

(56) References Cited

U.S. PATENT DOCUMENTS

| | | | | |
|---|---|---|---|---|
| 2009/0033823 A1* | 2/2009 | Chung | ................. | G09G 3/3648 349/54 |
| 2015/0378486 A1* | 12/2015 | Yu | ......................... | G06F 3/0412 345/174 |
| 2016/0322002 A1* | 11/2016 | Tseng | ..................... | G09G 3/344 |

FOREIGN PATENT DOCUMENTS

| | | |
|---|---|---|
| CN | 103914176 A | 7/2014 |
| CN | 204595382 U | 8/2015 |
| WO | 2014/026321 A1 | 2/2014 |

\* cited by examiner

*Primary Examiner* — Nathan Danielsen

(74) *Attorney, Agent, or Firm* — Kilpatrick Townsend & Stockton LLP

(57) ABSTRACT

An array substrate, a touch line repairing method as well as a display panel are provided. The array substrate includes a plurality of touch electrodes, a plurality of touch lines, a first repairing line, a second repairing line and at least one third repairing line. The touch lines and the touch electrodes are in one-to-one correspondence and are electrically connected. The first repairing line and the second repairing line are arranged in the same layer, and are not arranged in the same layer with the touch lines. The first repairing line and the second repairing line intersect each touch line. The at least one third repairing line is arranged in the same layer with the touch lines, and intersects the first repairing line and the second repairing line. The repairing lines can be used for repairing the disconnected touch lines, so that the production yield is enhanced.

18 Claims, 13 Drawing Sheets

(58) Field of Classification Search
CPC ........ G06F 2203/04113; G09G 3/2092; G09G 3/36–3/3696; G09G 2330/08–2330/12
See application file for complete search history.

ARRAY SUBSTRATE, METHOD FOR REPAIRING TOUCH LINE, AND DISPLAY PANEL

CROSS-REFERENCES TO RELATED APPLICATIONS

This application claims priority to Chinese Patent Application No. 201510989016.4, filed with the Chinese Patent Office on Dec. 24, 2015 and entitled "Array Substrate, Method For Repairing Touch Lines, And Display Panel", the contents of which are incorporated herein by reference in their entirety.

Technical Field

The present application relates to the technical field of display panels, and in particular to an array substrate and a method for repairing touch lines and a display panel.

Background

Display panels of the related art are mostly provided with a display function and a touch function, and are classified into display panels with a touch sensing structure arranged on the color filter substrate and display panels with a touch sensing structure arranged on at the array substrate. The touch signal of the touch sensing structure is inputted and outputted via the array substrate and a flexible circuit board overlapping jointed with the array substrate.

When the touch sensing structure is arranged on the color filter substrate, conductive gold ball bonds encapsulated by frame sealing glue are arranged at corresponding positions between the color filter substrate and the array substrate, and the touch sensing structure and the array substrate can be electrically connected by the gold ball bonds. When the touch sensing structure is arranged on the array substrate, the touch sensing structure and the array substrate are electrically connected by etching holes in the organic film layer. However, signal lines formed by crimping the gold ball bonds or etching holes both have the risk of breaking.

The touch function of the display panel can be worsened after the touch signal lines of the display panel are disconnected, so the corresponding disconnected signal lines are required to be repaired. However, as the increasing complexity of the process of the array substrate, the repairing of lines of the array substrate in small-size display panels are very difficult to design, and are phased out gradually, therefore there are not effective repairing means for disconnected lines at present.

SUMMARY

The embodiments of the disclosure provide an array substrate and a method for repairing touch lines and a display panel so as to solve the problem that there are not effective repairing means for disconnected lines in the related art.

In a first aspect, an array substrate provided by the embodiments of the disclosure, comprises:

a plurality of touch electrodes;

a plurality of touch lines which are in one-to-one correspondence with and electrically connected to the touch electrodes;

a first repairing line and a second repairing line which are arranged in the same layer, and are not arranged in the same layer with the touch lines, wherein the projection of the first repairing line at the light transmitting direction of the array substrate intersects a first end of each touch line, and the projection of the second repairing line at the light transmitting direction of the array substrate intersects a second end of each touch line; and at least one third repairing line which is arranged in the same layer with the touch lines, wherein the projections of the third repairing lines at the light transmitting direction of the array substrate respectively intersect the first repairing line and the second repairing line.

From the second aspect, the embodiments of the disclosure also provide a repairing method of touch lines based on the array substrate from the first aspect. The intersection regions of the touch lines and the first repairing line, the intersection regions of the touch lines and the second repairing line. The intersection regions of the third repairing lines and the first repairing line as well as the intersection regions of the third repairing lines and the second repairing line are all provided with conductive spacers.

The repairing method comprises: fusing the conductive spacers between first ends of disconnected touch lines and the first repairing line for electrical connection, fusing the conductive spacers between second ends of the disconnected touch lines and the second repairing line for electrical connection, fusing the conductive spacers between the third repairing lines and the first repairing line for electrical connection, and fusing the conductive spacers between the third repairing lines and the second repairing line for electrical connection.

From the third aspect, the embodiments of the disclosure also provide a display panel, comprising the array substrate described from the first aspect, and drive chips arranged at a non-display region of the array substrate;

a touch line repairing method as described from the second aspect is adopted for the array substrate to repair at least one disconnected touch line;

The drive chips are electrically connected to the second ends of the touch lines of the array substrate, and are used for transmitting display signals to the common electrode blocks of a display region of the array substrate via the touch lines, and transmitting touch signals to the touch electrodes at the display region of the array substrate through the touch lines, wherein the common electrode blocks are multiplexed as touch electrodes.

According to the technical scheme provided by the embodiments of the disclosure, second ends of disconnected touch lines are electrically communicated with first ends of the disconnected touch lines via the second repairing line, the third repairing lines and the first repairing line, so that the second ends of the disconnected touch lines and the first ends of the lines to form novel touch signal transmitting lines via the repairing lines, thereby repairing the disconnected touch lines in the array substrate. Compared with the prior art, the disconnected touch lines of the array substrate provided by the disclosure can be repaired effectively via the repairing lines, problems of the prior art are solved, and not only are the touch lines repaired, but also the production yield is enhanced.

DESCRIPTION OF DRAWINGS

In order to describe the technical scheme in the embodiments of the disclosure more clearly, accompanying drawings used in the description of the embodiments are introduced simply. Obviously, the accompanying drawings described below are parts of embodiments of the disclosure, and other drawings can be acquired according to these drawings by those skilled in the art without creative work.

DETAILED DESCRIPTION OF THE EMBODIMENTS

Figure 1:
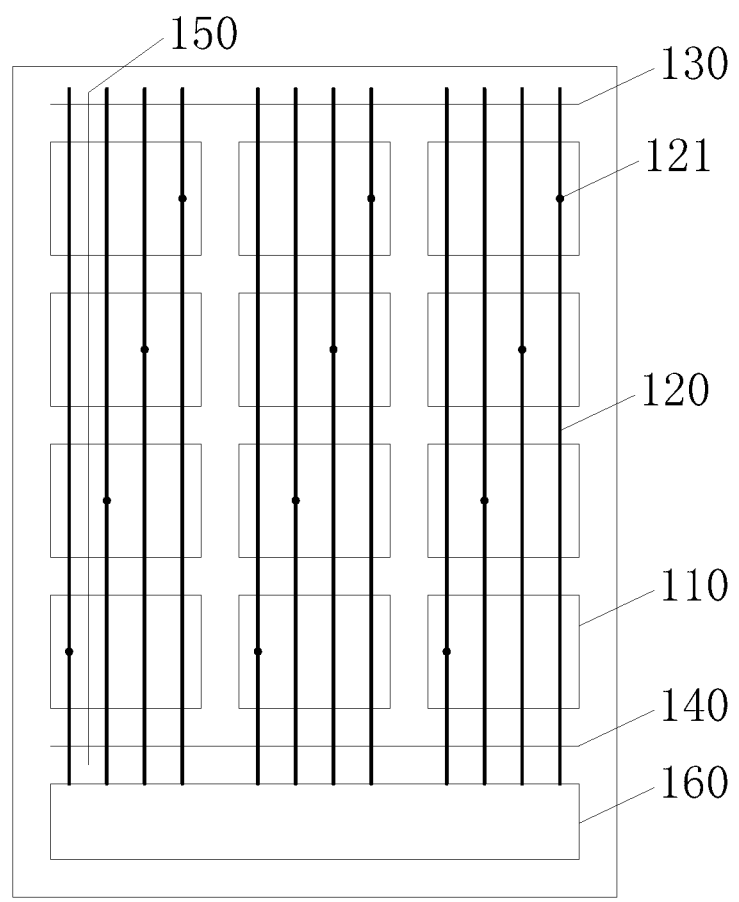
FIG. 1 is a top view of an array substrate provided by an embodiment of the disclosure.

The technical scheme of the disclosure will be clearly and completely described by referring to the drawings of the embodiments of the disclosure below. Apparently, the described embodiments are part of the embodiments, but not all the embodiments. Based on the embodiments of the disclosure, other embodiments obtained by those skilled in the art without creative work also belong to the protection scope of the disclosure.

FIG. 1 is a top view of an array substrate provided by an embodiment of the disclosure. As shown in FIG. 1, the array substrate provided by the embodiment includes: a plurality of touch electrodes 110, a plurality of touch lines 120, a first repairing line 130, a second repairing line 140 and at least one third repairing line 150. The plurality of touch lines 120 are in one-to-one correspondence with and electrically connected to the plurality of touch electrodes 110. The first repairing line 130 and the second repairing line 140 are arranged in a same layer, and are arranged in different layers with the plurality of touch lines 120. Each of the touch lines 120 includes a first end and a second end. The projection of the first repairing line 130 in the light transmitting direction of the array substrate intersects the first end of each touch line 120, and the projection of the second repairing line 140 in the light transmitting direction of the array substrate intersects the second end of each touch line 120. The third repairing line 150 is arranged in a same layer with the touch lines 120 and the projection of the third repairing line 150 in the light transmitting direction of the array substrate respectively intersects the first repairing line 130 and the second repairing line 140. Optionally, the array substrate further includes a drive chip 160 which transmits touch signals to the touch electrodes 110 via the touch lines 120.

As mentioned above, each of the touch lines 120 includes the first end and the second end. The first ends of the touch lines 120 intersect the first repairing line 130, and the second ends of the touch lines 120 intersect the second repairing lines 140. The third repairing line 150 and the touch lines 120 are arranged in a same layer. Each of the touch lines 120 is electrically connected to the corresponding one of the touch electrodes 110 via a through hole 121. The second ends of the touch lines 120 in the embodiment are electrically connected to the drive chip 160, so that each of the touch lines 120 receives a corresponding touch signal via the second end and the touch signal is transmitted to the corresponding touch electrode 110 connected to the touch line via the through hole 121. The disconnection of a touch line 120 means that the portion, between the second end and the through hole 121, of the touch line 120 is disconnected, consequently, the touch lines 120 cannot transmit the touch signals to the corresponding touch electrodes 110.

When a touch line 120 of the array substrate is disconnected, the second end of the disconnected touch line 20 will be electrically connected to the corresponding touch electrode via the second repairing line 140, the third repairing line 150, the first repairing line 130, the first end of the disconnected touch line 120 and the through hole 121 successively. That is, in that situation, the second end of the disconnected touch line 20 will be electrically connected to the corresponding touch electrode by electrically connecting the first end of the disconnected touch line 120 and the first repairing line 130, electrically connecting the first repairing line 130 and the third repairing line 150, electrically connecting the third repairing line 150 and the second repairing line 140, and electrically connecting the second repairing line 140 and the second end of the disconnected touch line 120, thereby forming a new touch line for transmitting signals. Therefore, touch signal of the disconnected touch line 120 is transmitted to the corresponding touch electrode 110 via the second end of the disconnected touch line, the second repairing line 140, the third repairing line 150, the first repairing line 130, the first end of the disconnected touch line and the through hole 121, thereby repairing the disconnected touch line 120 to be conductive.

It should be understood for a person skilled in the art that, when the array substrate includes more than one third repairing lines 150, each of the third repairing lines 150 can act as a spare repairing line for anyone of touch lines 120, but when more than one touch lines 120 of the array substrate are disconnected, one of the third repairing lines 150 can be selected to act as a repairing line for one of the disconnected touch lines 120 for repairing. In this embodiment, the third repairing line 150 adjacent to the disconnected touch line 120 is selected for repairing. It should be understood by a person skilled in the art that, in other embodiments, first ends of the touch lines in the array substrate are electrically connected to the drive chip so as to receive touch signals which are transmitted to the corresponding touch electrodes via through holes, then the disconnection of a touch line is that the portion, between the first end and the through hole, of the touch line is disconnected, leading to that the touch line cannot transmit the touch signal to the corresponding touch electrode.

According to the technical scheme provided by the embodiment, the second end of the disconnected touch line 20 will be electrically connected to the corresponding touch electrode via repairing lines, the first end of the disconnected touch line 120 and the through hole 121, by electrically connecting the second end of the disconnected touch line 120 and the second repairing line 140, electrically connecting the second repairing line 140 and the third repairing line 150, electrically connecting the third repairing line 150 and the first repairing line 130, and electrically connecting the first repairing line 130 and the first end of the disconnected touch line 120, thereby forming a new touch line for transmitting signals and repairing the disconnected touch line 120. The second ends of the touch lines 120 hereof are used for receiving touch signals, and then the second ends of the disconnected touch lines 120 are used for transmitting the touch signals to the corresponding touch electrodes 110 via the second repairing line 140, the third repairing lines 150, the first repairing line 130, the first ends of the lines and the through holes 121 sequentially. Compared with the related art, the disconnected touch lines 120 of the array substrate in the disclosure can be repaired effectively via the repairing lines, and the problem of no effective disconnected line repairing method of the touch lines in the related art is solved, and not only are the touch lines 120 repaired, but also the production yield is enhanced.

Figure 2:
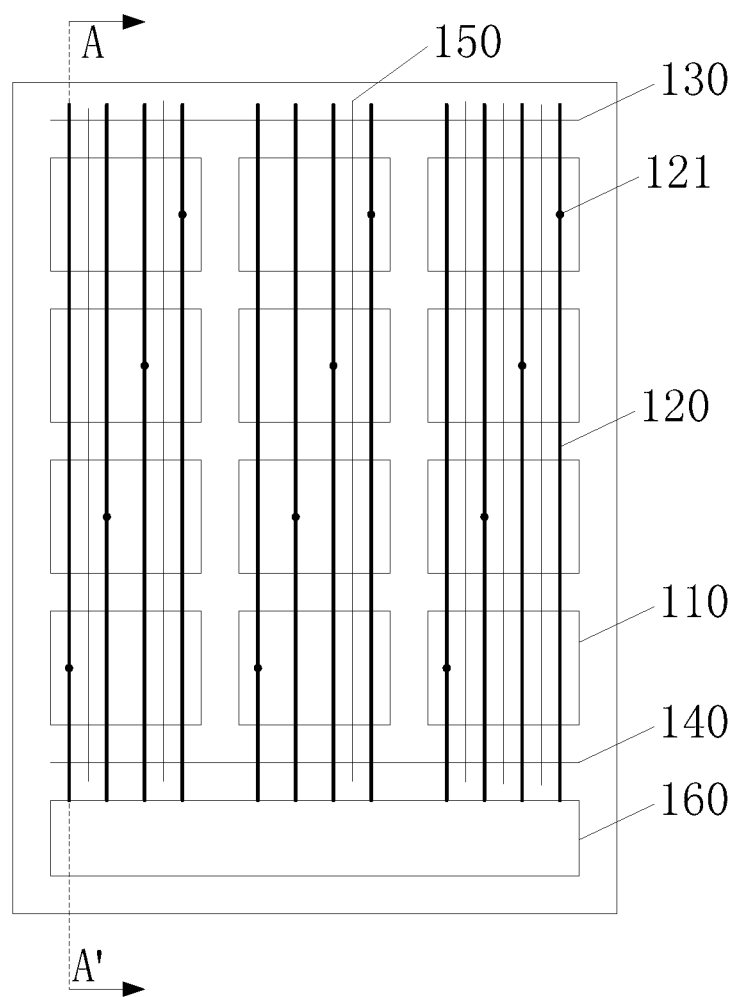
FIG. 2 is a top view of another array substrate provided by an embodiment of the disclosure.

FIG. 2 is a top view of another array substrate provided by the embodiments of the disclosure. As shown in FIG. 2, the plurality of touch electrodes 110 in the array substrate are configured in a matrix mode, and at least one third repairing line 150 is in corresponding arrangement with a column of touch electrodes 110. Drive chip 160 in the optional array substrate is electrically connected to the second ends of the touch lines 120 so as to transmit the touch signals to the touch electrodes 110. As mentioned above, the third repairing lines 150 and the touch lines 120 are arranged in the same layer. In an embodiment, at least one third repairing line 150 is correspondingly arranged in a column of touch electrodes 110.

When a touch line 120 in the array substrate is disconnected, one of the third repairing lines 150 is selected to repair the disconnected touch line 120, the selected third repairing line 150 corresponds to the column of touch electrodes including the touch electrode 110 electrically connected to the disconnected touch line 120. In an embodiment, the column of touch electrodes 110 correspond to a plurality of third repairing lines 150, the third repairing line 150 adjacent to the disconnected touch line 120 is selected as a repairing line for the disconnected touch line 120, so that each third repairing line 150 can act as an effective repairing line for repairing the disconnected touch line 120.

It should be understood by a person skilled in the art that the third repairing lines 150, the second repairing line 140 and the first repairing line 130 can be arranged based on the sizes of the touch electrodes 110 of the array substrate and the other requirements. The thicknesses of the repairing lines herein can be determined optionally according to the corresponding requirements of the array substrate, and also optionally, the repairing lines and the touch lines 120 can be equal in thickness. Regarding to the amount of the third repairing lines 150, at least one third repairing line 150 can be optionally in corresponding arrangement with one or more columns of touch electrodes 110.

Figure 3:
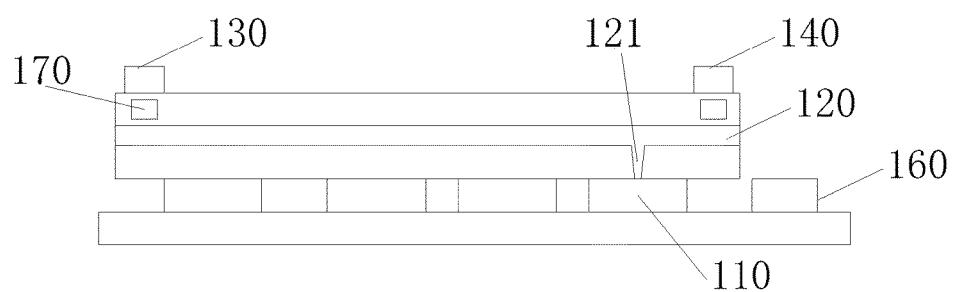
FIG. 3 is a cross sectional view of the array substrate along A-A' as shown in FIG. 2.

FIG. 3 is a cross sectional view of the array substrate along A-A' in FIG. 2, and is described in conjunction with the FIG. 2. In the array substrate, the intersection regions of the touch lines 120 and the first repairing line 130, the intersection regions of the touch lines 120 and the second repairing line 140, the intersection regions of the third repairing lines 150 and the first repairing line 130 as well as the intersection regions of the third repairing lines 150 and the second repairing line 140 are all provided with conductive spacers 170. As shown in FIG. 2, the third repairing lines 150 and the touch lines 120 are arranged in the same layer, so in the cross sectional view of the array substrate shown in FIG. 3, the third repairing lines 150, the conductive spacers 170 between the third repairing lines 150 and the first repairing line 130 and the conductive spacers 170 between the third repairing lines 150 and the second repairing line 140 are not shown. The touch lines 120 and the touch electrodes 110 are insulated, the first repairing line 130 and the second repairing line 140 are insulated, and the first repairing line 130 and the second repairing line 140 are insulated from the touch lines 120.

As stated above, in repairing the disconnected touch lines 120, the first ends of the touch lines 120 and the first repairing line 130 are electrically connected by fusing the conductive spacers 170 therebetween. The second ends of the touch lines 120 and the second repairing line 140 are electrically connected by fusing the conductive spacers 170 therebetween. The third repairing line 150 corresponding to the disconnected touch lines 120 and the first repairing line 130 are electrically connected by fusing the conductive spacers 170 therebetween. The third repairing lines 150 and the second repairing line 140 are electrically connected by fusing the conductive spacers 170 therebetween, so that the second ends of the disconnected touch lines 120 are electrically connected to the through holes 121 via the second repairing line 140, the third repairing lines 150, the first repairing line 130 and the first ends of the lines, which are electrically connected. The drive chip 160 transmits the touch signals by the repairing lines of the disconnected touch lines 120 to the corresponding touch electrodes 110 by the first ends of the touch lines and the through holes 121.

Optionally, the conductive spacers 170 are conductive gold ball bonds packaged in a seal. Before the conductive spacers 170 are fused, the conductive spacers 170 are arranged between the repairing lines and the touch lines 120 in an insulated mode, and are arranged among the repairing lines in different layers. After being fused, conductive gold ball bonds (that is, the conductive spacers 170) are used for electrically connecting the repairing lines with the touch lines 120 and electrically connecting the repairing lines in different layers to repair the disconnected touch lines 120.

Regarding any array substrate in the embodiment, in order to reduce the area, occupied by the repairing lines, in the light transmitting regions of the display region of the array substrate, the first repairing line 130 and the second repairing line 140 are arranged in the non-display region of the array substrate and the third repairing lines 150 are arranged in display region of the array substrate. Therefore, both the first ends and the second ends of the touch lines 120 extend to the non-display region.

Figure 4A:
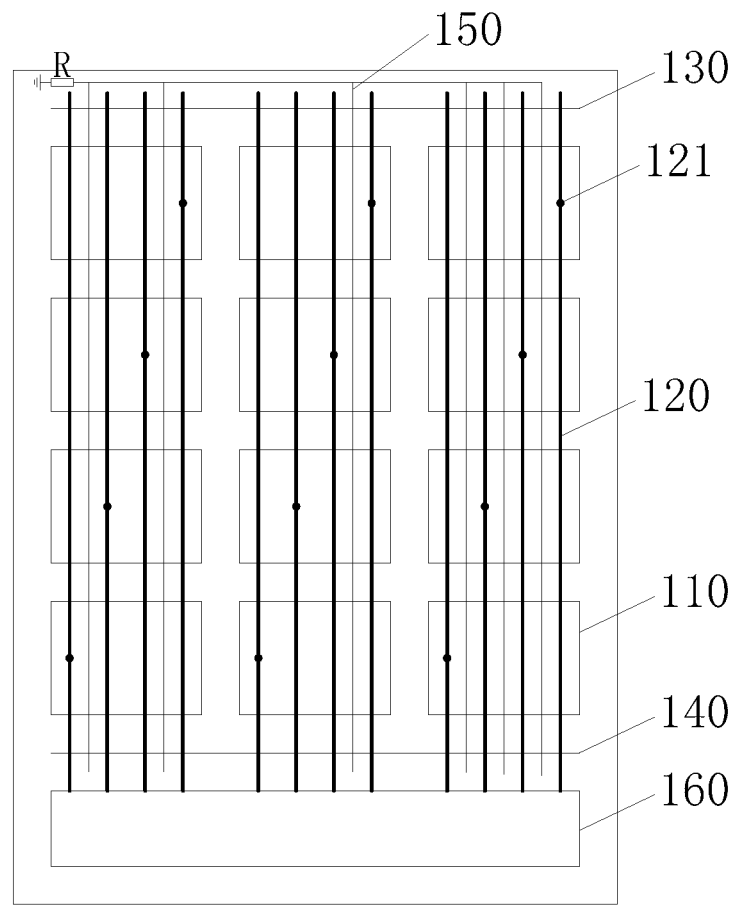
FIG. 4a is a schematic diagram of another array substrate provided by an embodiment of the disclosure.
Figure 4B:
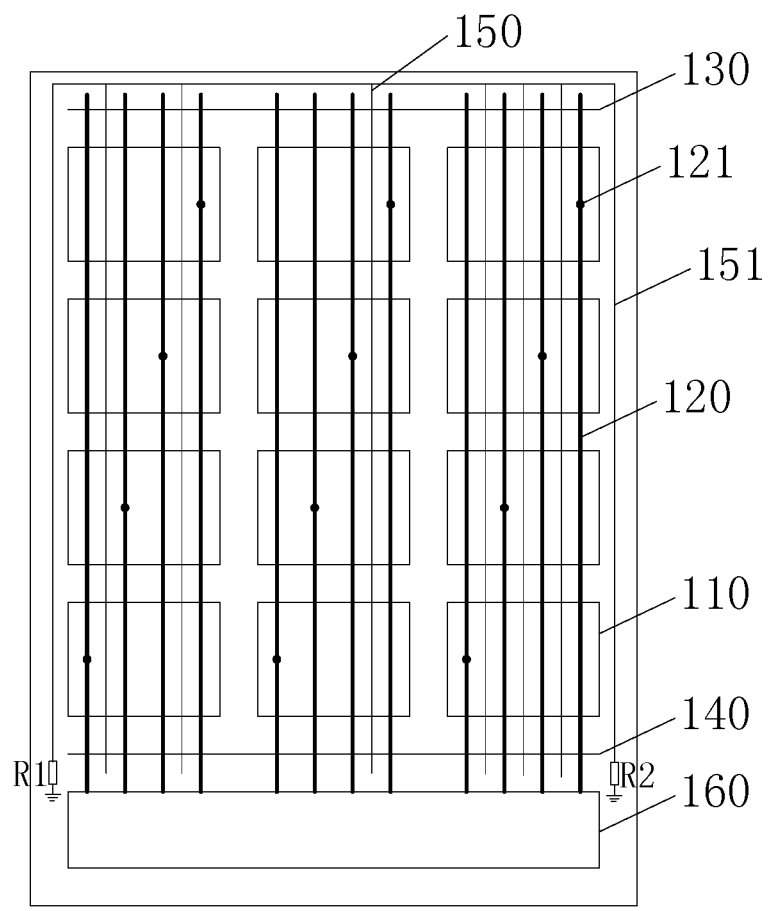
FIG. 4b is a schematic diagram of another array substrate provided by an embodiment of the disclosure.

Regarding the array substrate as shown in FIG. 4a, each third repairing line 150 is grounded. Particularly, the same ends of third repairing lines 150 are optionally directly connected together electrically, and then are grounded via a ground resistor R so as to export electric charge or current in the repairing lines so as to guarantee the normal operation of the array substrate. Regarding another array substrate as shown in FIG. 4b, each third repairing line 150 is grounded. Particularly, a grounding line 151, two ends of which are grounded via the ground resistors, is arranged at the periphery of the display region (that is, the non-display region) of the array substrate optionally, and the same ends of all the third repairing lines 150 are respectively electrically connected to the grounding line 151, so that all the third repairing lines 150 are grounded via grounding resistors R1 and R2. It should be understood by a person skilled in the art that each repairing line 150 optionally can be respectively grounded via the grounding resistors, and the grounding parts of the third repairing lines 150 can be adjusted without limit.

In any array substrate in the embodiments, the repairing lines can be metal lines, metal oxide lines or other conductive materials.

Any array substrate provided by above embodiments also includes a common electrode layer including a plurality of common electrode blocks, and the common electrodes are multiplexed as touch electrodes 110. As mentioned above, at the display phase, the array substrate transmits common electrode signals to the corresponding touch electrodes 110 via the touch lines 120 to display; and at the touch phase, the array substrate transmits the touch signals to the corresponding touch electrodes 110 by the touch lines 120 to realize the touch function. When at least one touch line 120 in the array substrate is disconnected, the disconnected touch lines 120 are repaired so as to form new signal transmitting lines. Regarding the disconnected touch lines 120, at the display phase, the signal transmitting lines which are formed after repairing the array substrate are used for transmitting the common electrode signals to the corresponding touch electrodes 110 to display; at the touch phase, the signal transmitting lines which are formed after repairing the array substrate are used for transmitting the touch signals to the corresponding touch electrodes 110 to realize the touch function.

Figure 5A:
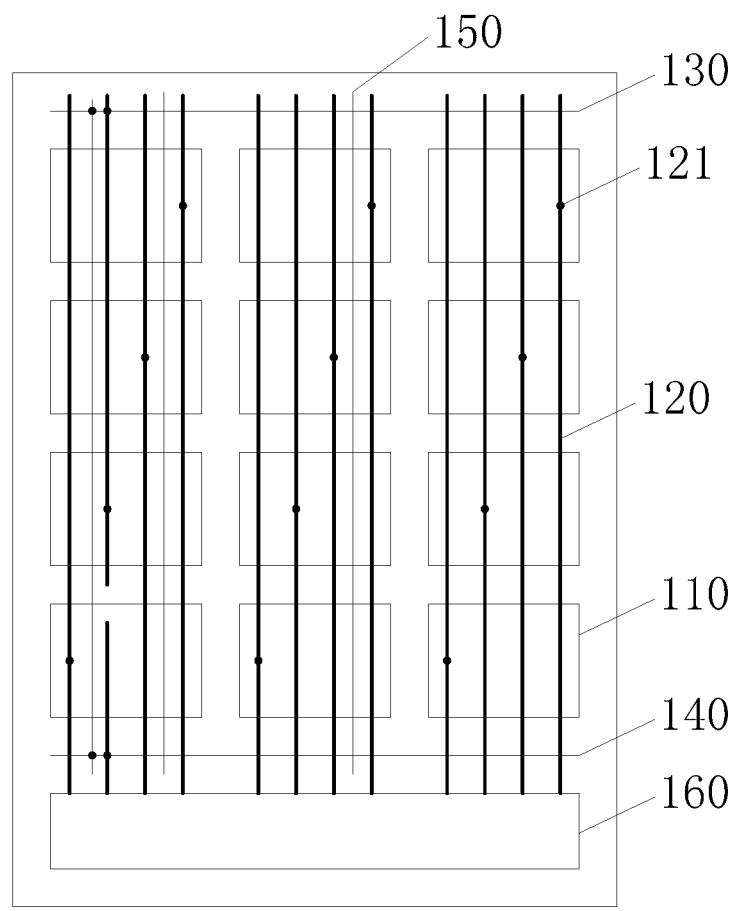
FIG. 5a is a flow chart of a method for repairing touch lines of an array substrate provided by an embodiment of the disclosure.
Figure 5B:
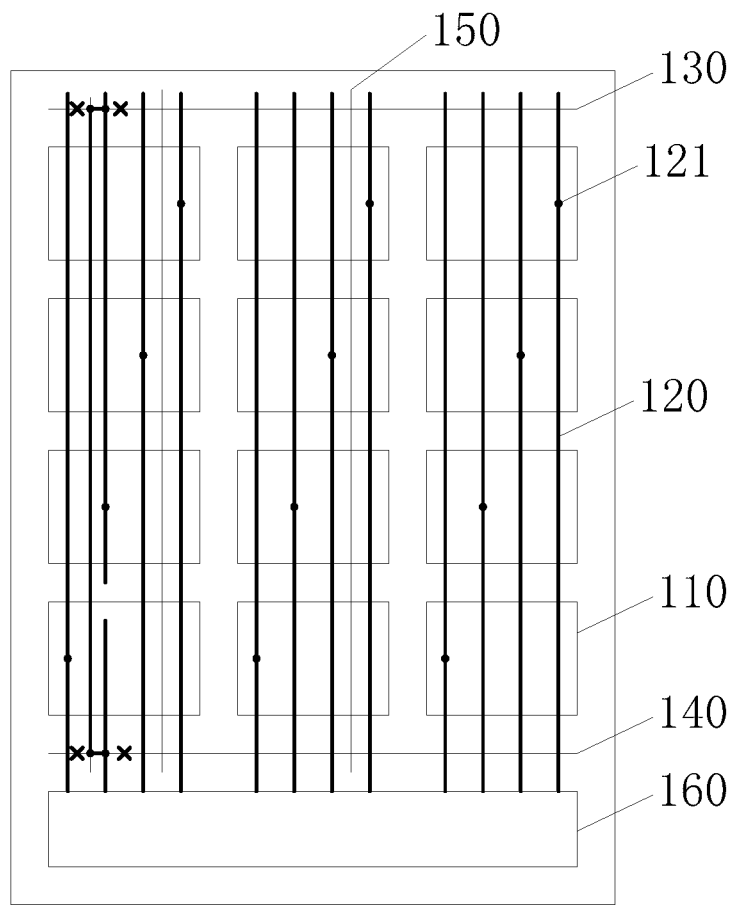
FIG. 5b is a flow chart of a method for repairing touch lines of an array substrate provided by an embodiment of the disclosure.

As shown in FIGS. 5a-5b, another embodiment of the disclosure provides a flow chart of a method for repairing touch lines of the array substrate. The array substrate in the present embodiment is the array substrate described in any above embodiment. The touch lines 120 are any touch line 120 described in any above embodiment.

In the array substrate, the intersection regions of the touch lines 120 and the first repairing line 130, the intersection regions of the touch lines 120 and the second repairing line 140, the intersection regions of the third repairing lines 150 and the first repairing line 130 as well as the intersection regions of the third repairing lines 150 and the second repairing line 140 are all provided with conductive spacers. An optionally arranged array substrate herein also comprises drive chips 160 which are electrically connected to the second ends of the touch lines 120 so as to transmit the touch signals to the corresponding touch electrodes 110 via the touch lines 120.

The method for repairing the touch lines 120 of the array substrate in the embodiment includes: as shown in FIG. 5a, fusing the conductive spacers between first ends of disconnected touch lines 120 and the first repairing line 130 for electrical connection, fusing the conductive spacers between second ends of the disconnected touch lines 120 and the second repairing line 140 for electrical connection, fusing the conductive spacers between the third repairing lines 150 and the first repairing line 130 for electrical connection, and fusing the conductive spacers between the third repairing lines 150 and the second repairing line 140 for electrical connection.

As mentioned above, the touch lines 120 are electrically connected to the corresponding touch electrodes 110 via through holes 121. The second ends of the touch lines 120 are electrically connected to drive chips 160, so that the disconnection of the touch lines 120 means that the through holes 121 of the touch lines 120 and the second ends of the touch lines 120 are disconnected. As shown in FIG. 5a, a column of touch electrodes 110 are correspondingly provided with at least one third repairing line 150, then one of third repairing lines 150 optionally acts as a repairing line of one disconnected touch line 120 in the column of touch electrodes 110. And in an embodiment the third repairing line 150 at the left side of the disconnected touch line 120 acts as repairing lines of the disconnected touch line 120.

As can be seen, Touch signals of the disconnected touch lines 120 can be transmitted via a signal path: the second ends of the lines, the second repairing line 140, the third repairing lines 150, the first repairing line 130, the first ends of the lines and the through holes 121. The conductive spacers between the first ends of the disconnected touch lines 120 and the first repairing line 130 are fused for electrical connection, the conductive spacers between the second ends of the disconnected touch lines 120 and the second repairing line 140 are fused for electrical connection, the conductive spacers between the third repairing lines 150 and the first repairing line 130 are fused for electrical connection, and the conductive spacers between the third repairing lines 150 and the second repairing line 140 are fused for electrical connection, so that the disconnected touch lines 120 become conductive by repairing lines, and the touch signals of the disconnected touch lines 120 are transmitted to the corresponding touch electrodes 110 via the second ends, the repairing lines, the first ends and the through holes 121.

In the present embodiment, the third repairing lines 150 are positioned at the first side of the disconnected touch lines 120, the first repairing line 130 intersects the first end of each touch line 120, and the second repairing line 140 intersects the second end of each touch line 120, thus facilitating to the reparation of other touch lines 120 by the first repairing line 130 and the second repairing line 140. An optional repairing method herein further includes, as shown in FIG. 5b, disconnecting the first repairing line 130 into a plurality of parts by fusing at positions of the first repairing line 130 and disconnecting the second repairing line 140 into a plurality of parts by fusing at positions of the second repairing line 140. The positions of the first repairing line 130 being fused correspond to the first side of the third repairing lines 150 and the positions of the second repairing line 140 being fused correspond to the first side of the third repairing lines 150. Therefore, a part of the first repairing line 130, the third repairing line 150 and a part of the second repairing line 140 can act as signal transmitting lines of the disconnected touch lines 120. The part of the first repairing line 130 is between the disconnected touch line 120 and the third repairing line 150 and is formed by fusing the first repairing line 130. In addition, the part of the first repairing line 130 is electrically connected to the disconnected touch line 120 and the third repairing line 150 via fused conductive spacers. The part of the second repairing line 140 is between the disconnected touch line 120 and the third repairing line 150 and is formed by fusing the second repairing line 140. In addition, the part of the second repairing line 140 is electrically connected to the disconnected touch line 120 and the third repairing line 150 via fused conductive spacers.

Figure 6A:
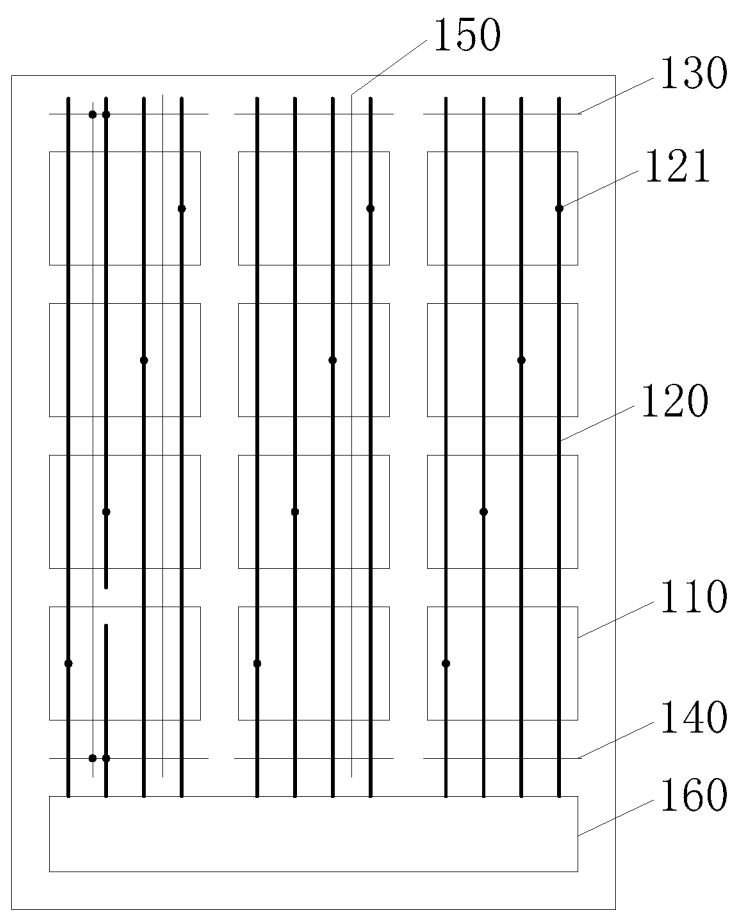
FIG. 6a is a flow chart of a method for repairing touch lines of an array substrate provided by an embodiment of the disclosure.
Figure 6B:
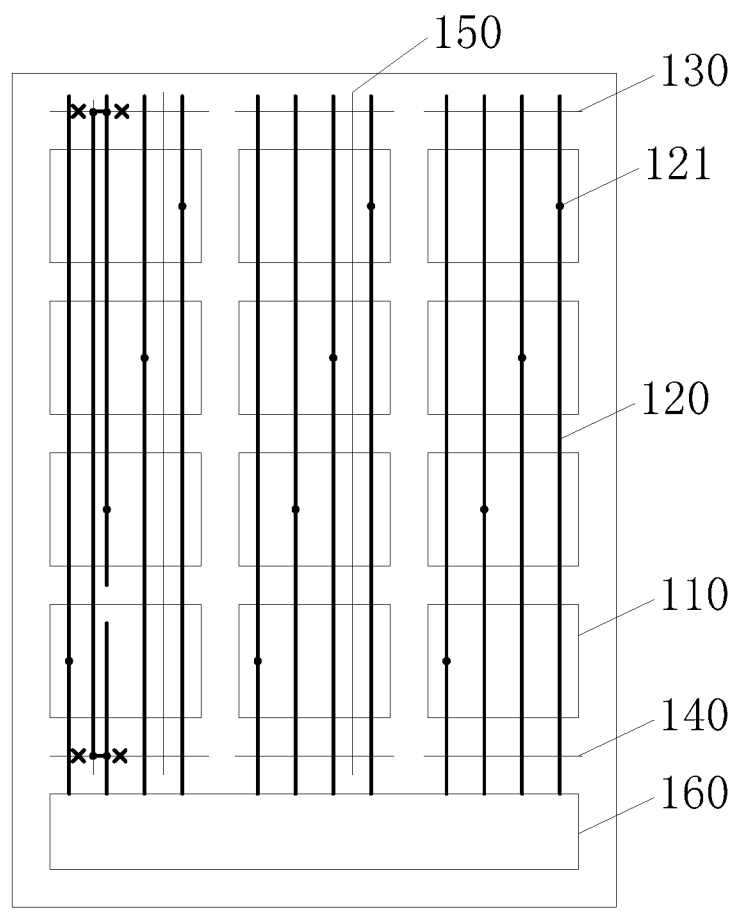
FIG. 6b is a flow chart of a method for repairing touch lines of an array substrate provided by an embodiment of the disclosure.

FIGS. 6a-6b are flow charts of a method for repairing the touch lines of the array substrate provided by another embodiment of the disclosure. The first repairing line 130 of the array substrate in the embodiment includes a plurality of first sub lines, and the projection of each of the first sub lines in the light transmitting direction of the array substrate respectively intersects the third repairing lines 150 and the first end of at least one touch line 120; and/or the second repairing line 140 includes a plurality of second sub lines, and the projection of each of the second sub lines in the light transmitting direction of the array substrate respectively intersects the third repairing lines 150 and the second end of at least one touch line 120.

As shown in FIG. 5a, the first repairing line 130 includes a plurality of first sub lines; the second repairing line 140 includes a plurality of second sub lines; and at least one third repairing line 150 is in one-to-one correspondence with at least one column of touch electrodes 110. In order to repair any touch line 120 corresponding to one column of touch electrodes 110 by the repairing lines, optionally, the first sub lines are in one-to-one correspondence with the third repairing lines 150, and at least one first sub repairing line is in corresponding arrangement with a column of touch electrodes 110; and/or the second sub lines are in one-to-one correspondence with the third repairing lines 150, and at least one second sub repairing line is in corresponding arrangement with a column of touch electrodes 110.

A method for repairing touch lines 120 of the array substrate in the present embodiment includes: as shown in FIG. 6a, fusing the conductive spacers between first ends of disconnected touch lines 120 and the first sub repairing line for electrical connection, fusing the conductive spacers between second ends of the disconnected touch lines 120 and the second sub repairing line for electrical connection, fusing the conductive spacers between the third repairing lines 150 and the first sub repairing line for electrical connection, and fusing the conductive spacers between the third repairing lines 150 and the second sub repairing line for electrical connection.

In order to repair other touch lines 120 by the sub lines, alternatively, as shown in FIG. 6b, the parts, corresponding to the first sides of the third repairing lines 150, of the first sub repairing line and the second sub repairing line respectively are fused, and the parts, corresponding to the second sides of the disconnected touch lines 120, of the first sub repairing line and the second sub repairing line respectively are fused.

Figure 7A:
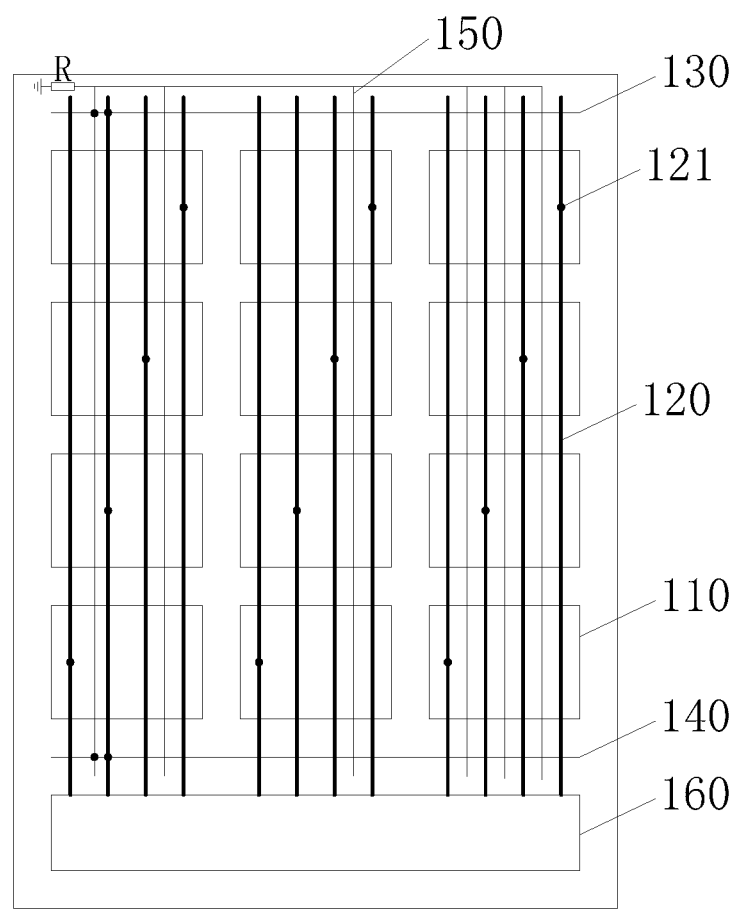
FIG. 7a is a flow chart of a method for repairing touch lines of an array substrate provided by an embodiment of the disclosure.
Figure 7B:
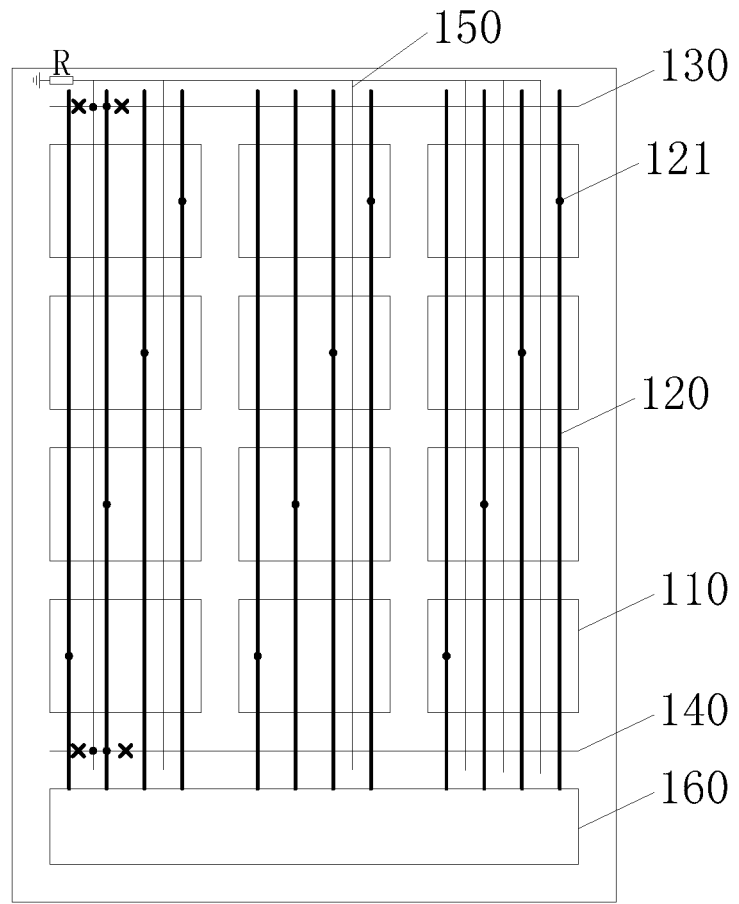
FIG. 7b is a flow chart of a method for repairing touch lines of an array substrate provided by an embodiment of the disclosure.
Figure 7C:
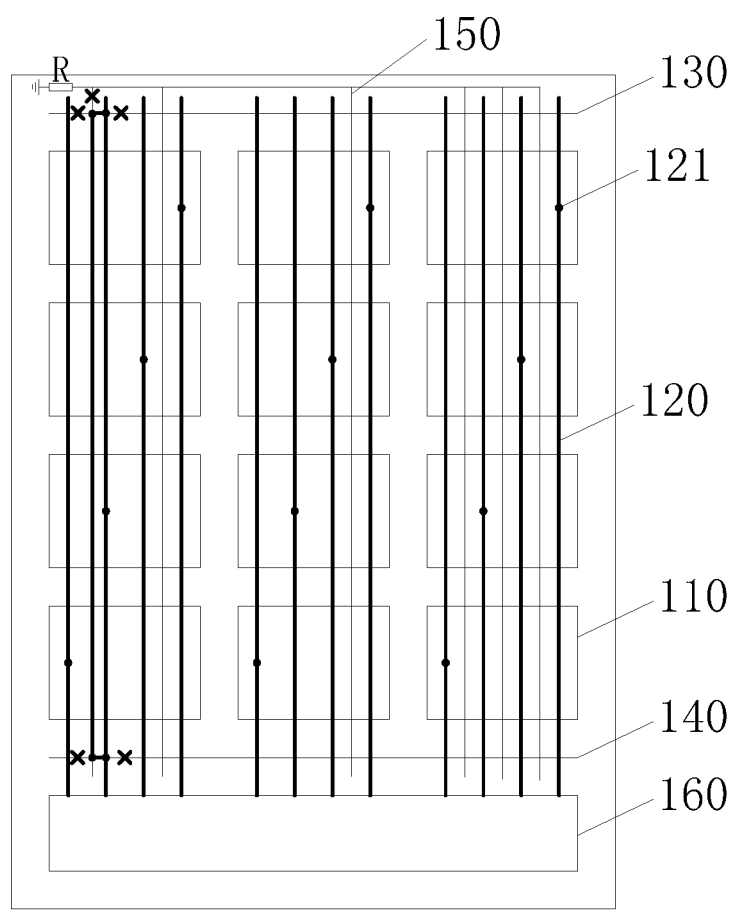
FIG. 7c is a flow chart of a method for repairing touch lines of an array substrate provided by an embodiment of the disclosure.

FIGS. 7a-7c show the flow chart of a method for repairing the touch lines of the array substrate provided by another embodiment of the disclosure. In the embodiment, each third repairing line 150 of the array substrate is grounded. Correspondingly, the method for repairing the touch lines 120 of the array substrate in the embodiment includes: a first step, a second step and a third step. In the first step, as shown in FIG. 7a, fusing the conductive spacers between first ends of disconnected touch lines 120 and the first repairing line 130 for electrical connection, fusing the conductive spacers between second ends of the disconnected touch lines 120 and the second repairing line 140 for electrical connection, fusing the conductive spacers between the third repairing lines 150 and the first repairing line 130 for electrical connection, and fusing the conductive spacers between the third repairing lines 150 and the second repairing line 140 for electrical connection. In the second step, as shown in FIG. 7b, fusing the parts, corresponding to the first sides of the third repairing lines 150, of the first repairing line 130 and the second repairing line 140 respectively, and fusing the parts, corresponding to the second sides of the disconnected touch lines 120, of the first repairing line 130 and the second repairing line 140 respectively. In the third step, as shown in FIG. 7c, disconnecting the third repairing lines 150 and ground.

In any method for repairing the touch lines 120 of the embodiment, the conductive spacers are fused by a laser technology; and/or at least one of the first repairing line 130, the second repairing line 140 and the third repairing lines 150 are fused by a laser technology. The laser technology herein is used for fusing the repairing lines and the conductive spacers by high temperature.

Figure 8:
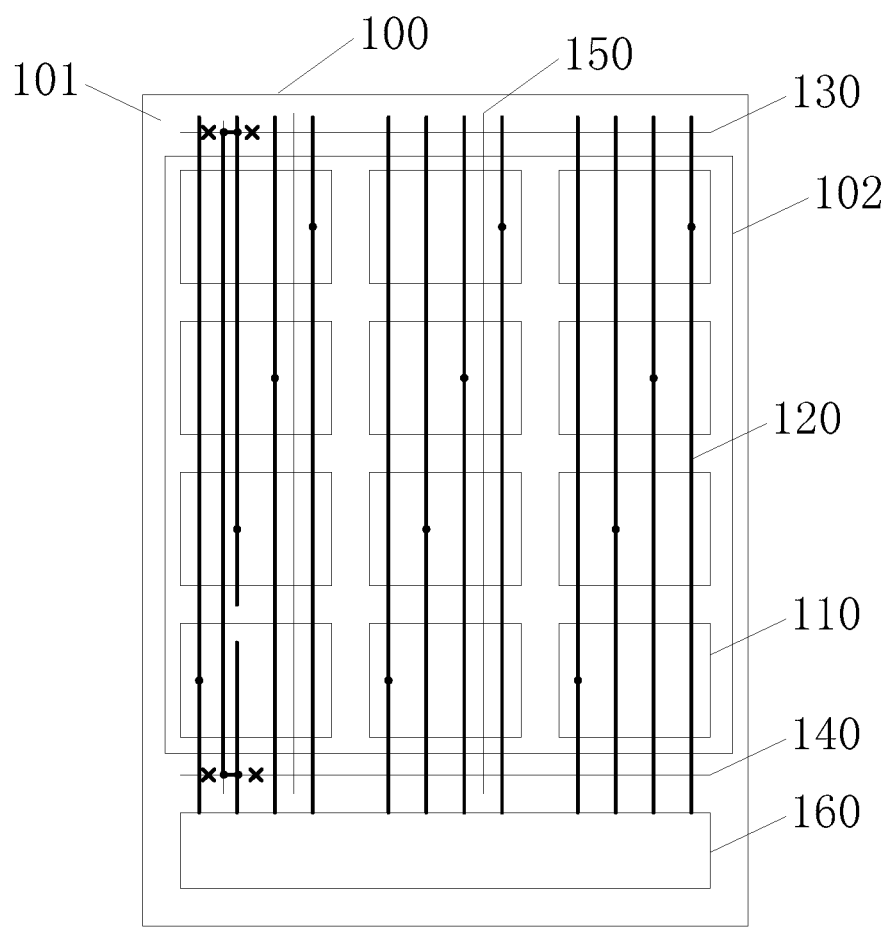
FIG. 8 is a schematic diagram of a display panel provided by an embodiment of the disclosure.

The FIG. 8 is a schematic diagram of a display panel provided by another embodiment of the disclosure. As shown in the FIG. 8, the display panel includes an array substrate 100 described in any above embodiment and a driving chip 160 arranged at a non-display region of the array substrate 100. The method for repairing touch lines is adopted for the array substrate 100 to repair at least one disconnected touch line 120.

In this embodiment, the driving chip 160 is electrically connected to the second ends of the touch lines 120 of the array substrate 100, and is used for transmitting display signals to common electrode blocks in a display region 102 of the array substrate 100 via the touch lines 120, and transmitting touch signals to the touch electrodes 110 in the display region 102 of the array substrate 100 via the touch lines 120, and the common electrode blocks are multiplexed as touch electrodes 110.

In this embodiment, film layer of the first repairing line 130 and film layer of the second repairing line 140 are arranged on the array substrate 100; film layer of the third repairing lines 150 and film layer of the touch lines 120 are in the same layer and are arranged on the array substrate 100, so that the array substrate 100 of the embodiment is applicable to a integrated display panel with display function and touch function in which the touch layer is arranged on the array substrate 100. It should be noted that all the first repairing line 130, the second repairing line 140, the third repairing lines 150 and the touch lines 120 can be arranged in different layers, and then the repairing process is similar to that described in any above embodiment, and we will not describe here in detail.

It should be noted that the content above is merely a part of embodiments and the applied technical principle. It should be understood by a person skilled in the art that the disclosure is not limited to the specific embodiments, and various obvious modifications, readjustment and substitutions are all in the protection scope of the disclosure. Therefore, although the disclosure is described in detail by the embodiments above, the disclosure is not merely limited thereto, and also can include other more equivalent embodiments within the concept of the disclosure. The scope of the disclosure is determined by the scope of the attached claims.

We claim:

1. An array substrate, characterized by comprising
a plurality of touch electrodes;
a plurality of touch lines in one-to-one correspondence with and electrically connected to the plurality of touch electrodes;
a first repairing line and a second repairing line; and
at least one third repairing line; and, wherein
the first repairing line and the second repairing line are arranged in a same layer, and the first repairing line and the second repairing line are arranged in different layers with the plurality of touch lines;
a projection of the first repairing line at a light transmitting direction of the array substrate intersects a first end of each of the plurality of touch lines, and a projection of the second repairing line at a light transmitting direction of the array substrate intersects a second end of each of the plurality of touch lines;
the at least one third repairing line is arranged in a same layer with the plurality of touch lines; and a projection of the at least one third repairing line at a light transmitting direction of the array substrate intersects the first repairing line and the second repairing line, wherein the intersection regions between the plurality of touch lines and the first repairing line, the intersection regions between the plurality of touch lines and the second repairing line, the intersection region between the at least one third repairing line and the first repairing line as well as the intersection region between the at least one third repairing line and the second repairing line are all provided with conductive spacers.

2. The array substrate according to claim 1, wherein the plurality of touch electrodes are configured in columns and rows, and the at least one third repairing line is in correspondence with a column of touch electrodes.

3. The array substrate according to claim 1, wherein the first repairing line and the second repairing line are arranged at a non-display region of the array substrate; and the third repairing line is arranged at a display region of the array substrate.

4. The array substrate according to claim 1, wherein each third repairing line is grounded.

5. The array substrate according to claim 1, wherein the first repairing line, the second repairing line and the at least one third repairing line are made of conductive material.

6. The array substrate according to claim 1, further comprising a common electrode layer comprising a plurality of common electrodes multiplexed as touch electrodes.

7. A method for repairing the touch lines of the array substrate according to claim 1, wherein the intersection regions between the touch lines and the first repairing line, the intersection regions between the touch lines and the second repairing line, the intersection regions between the third repairing lines and the first repairing line as well as the intersection regions between the third repairing lines and the second repairing line are all provided with conductive spacers; the method comprising:
  fusing the conductive spacers between first ends of disconnected touch lines and the first repairing line for electrical connection;
  fusing the conductive spacers between second ends of the disconnected touch lines and the second repairing line for electrical connection;
  fusing the conductive spacer between at least one the third repairing line and the first repairing line for electrical connection; and
  fusing the conductive spacer between the at least one third repairing line and the second repairing line for electrical connection.

8. The method according to claim 7, wherein the at least one third repairing line is positioned at a first side of the disconnected touch line; and the method further comprises:
  disconnecting the first repairing line into a plurality of parts by fusing at positions of the first repairing line and disconnecting the second repairing line into a plurality of parts by fusing at positions of the second repairing line; and, wherein
  the positions of the first repairing line being fused correspond to the first side of the third repairing lines and the positions of the second repairing line being fused correspond to the first side of the third repairing lines.

9. The method according to claim 8, wherein
the conductive spacers are fused by laser;
the first repairing line is fused into a plurality of parts by laser;
the second repairing line is fused into a plurality of parts by laser.

10. The method according to claim 7, wherein at least one of the first repairing line and the second repairing line comprising a plurality of sub lines, the plurality of touch electrodes are arranged in columns and rows, the array substrate comprises a plurality of third repairing lines, wherein
  a projection of each of the sub lines of the first repairing line at a light transmitting direction of the array substrate intersects the at least one of the plurality of third repairing lines and the first end of at least one of the plurality of touch lines; and
  a projection of each of the sub lines of the second repairing line at a light transmitting direction of the array substrate intersects the at least one of the plurality of third repairing lines and the second end of at least one of the plurality of touch line.

11. The method according to claim 10, wherein the plurality of sub lines of the first repairing line are in one-to-one correspondence with the plurality of third repairing lines and at least one of the plurality of sub lines of the first repairing line is in corresponding arrangement with a column of touch electrodes, or, the plurality of sub lines of the second repairing line are in one-to-one correspondence with the plurality of third repairing lines and at least one of the plurality of sub lines of the second repairing line is in corresponding arrangement with a column of touch electrodes.

12. The method according to claim 10, wherein the plurality of sub lines of the first repairing line are in one-to-one correspondence with the plurality of third repairing lines and at least one of the plurality of sub lines of the first repairing line is in corresponding arrangement with a column of touch electrodes, and, the plurality of sub lines of the second repairing line are in one-to-one correspondence with the plurality of third repairing lines and at least one of the plurality of sub lines of the second repairing line is in corresponding arrangement with a column of touch electrodes.

13. The method according to claim 7, wherein the at least one third repairing line is grounded; and the method further comprises: disconnecting the at least one third repairing lines and the ground.

14. The method according to claim 7, wherein the conductive spacers are fused by laser.

15. The method according to claim 7, wherein the conductive spacers are fused by laser and the method further comprises: fusing at least one of the third repairing line, the second repairing line and the third repairing line by laser.

16. A display panel, comprising an array substrate and a drive chip arranged at a non-display region of the array substrate;
  wherein the array substrate comprises
  a plurality of touch electrodes;
  a plurality of touch lines in one-to-one correspondence with and electrically connected to the plurality of touch electrodes;
  a first repairing line and a second repairing line; and
  at least one third repairing line; and, wherein
  the first repairing line and the second repairing line are arranged in a same layer, and the first repairing line and the second repairing line are arranged in different layers with the plurality of touch lines;
  the first repairing line intersects a first end of each of the plurality of touch lines, and the second repairing line intersects a second end of each of the plurality of touch lines;

the at least one third repairing line is arranged in a same layer with the plurality of touch lines, and the at least one third repairing line intersects the first repairing line and the second repairing line;

the drive chip is electrically connected to the second ends of the touch lines, and is used for transmitting display signals to common electrodes in a display region of the array substrate via the touch lines, and transmitting touch signals to the touch electrodes in the display region of the array substrate via the touch lines, wherein common electrodes are multiplexed as touch electrodes, wherein the intersection regions between the plurality of touch lines and the first repairing line, the intersection regions between the plurality of touch lines and the second repairing line, the intersection region between the at least one third repairing line and the first repairing line as well as the intersection region between the at least one third repairing line and the second repairing line are all provided with conductive spacers.

17. The display panel according to claim 16, wherein the plurality of touch electrodes are configured in columns and rows, and the at least one third repairing line is in correspondence with a column of touch electrodes.

18. The display panel according to claim 16, wherein the first repairing line and the second repairing line are arranged at a non-display region of the array substrate; the third repairing line is arranged at the display region of the array substrate.

* * * * *